(12) United States Patent
Bergner et al.

(10) Patent No.: US 12,502,155 B2
(45) Date of Patent: Dec. 23, 2025

(54) WIRELESS CT DATA TRANSMISSION

(71) Applicant: KONINKLIJKE PHILIPS N.V., Eindhoven (NL)

(72) Inventors: Frank Bergner, Hamburg (DE); Claas Bontus, Hamburg (DE); Klaus Erhard, Hamburg (DE); Nikolas David Schnellbächer, Lübeck (DE); Dirk Schäfer, Hamburg (DE); Sven Peter Prevrhal, Hamburg (DE); Peter Vernickel, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 216 days.

(21) Appl. No.: 17/780,496

(22) PCT Filed: Dec. 3, 2020

(86) PCT No.: PCT/EP2020/084351
§ 371 (c)(1),
(2) Date: May 26, 2022

(87) PCT Pub. No.: WO2021/115891
PCT Pub. Date: Jun. 17, 2021

(65) Prior Publication Data
US 2023/0000458 A1 Jan. 5, 2023

(30) Foreign Application Priority Data
Dec. 11, 2019 (EP) .................................... 19215192

(51) Int. Cl.
*A61B 6/00* (2006.01)
*A61B 6/02* (2006.01)
(Continued)

(52) U.S. Cl.
CPC .............. *A61B 6/563* (2013.01); *A61B 6/027* (2013.01); *A61B 6/035* (2013.01); *A61B 6/40* (2013.01)

(58) Field of Classification Search
CPC .... A61B 6/00; A61B 6/02; A61B 6/03; A61B 6/563; A61B 6/027; A61B 6/40;
(Continued)

(56) References Cited

U.S. PATENT DOCUMENTS 7,599,467 B2 10/2009 Popescu
7,755,055 B2 7/2010 Schilling
(Continued)

FOREIGN PATENT DOCUMENTS

DE 102009049052 A1 4/2011
JP S58109033 S 6/1983
JP 2019167436 A 10/2019

OTHER PUBLICATIONS

PCT International Search Report, International application No. PCT/EP2020/084351, Feb. 22, 2021.

*Primary Examiner* — Jurie Yun
(74) *Attorney, Agent, or Firm* — Larry Liberchuk

(57) ABSTRACT

An imaging system (MIS), optionally a medical imaging system, with wireless communication capability and related method. The imaging system comprises a gantry (RG) rotatable around a rotation axis. The gantry includes a detector device (D) capable of recording, in plural spatial positions, measurement data in relation to a subject (such as a patient) (PAT) to be imaged. The system also includes a radio transmitter (TX) for generating a directed radio beam propagatable along a propagation axis to transmit the measurement data to a radio receiver (RX). The radio transmitter (TX) is arranged at the rotatable gantry and is operable so
(Continued)

that the propagation direction intersects the rotation axis in a location that is situated away from the rotatable gantry.

5 Claims, 6 Drawing Sheets

(51) Int. Cl.
*A61B 6/03* (2006.01)
*A61B 6/40* (2024.01)

(58) Field of Classification Search
CPC ........... A61B 6/035; A61B 6/032; A61B 6/56; H01Q 21/20; H01Q 3/34
See application file for complete search history.

(56) References Cited

U.S. PATENT DOCUMENTS

| | | |
|---|---|---|
| 2007/0080298 A1 | 4/2007 | Kohler et al. |
| 2008/0272296 A1 | 11/2008 | Frach et al. |
| 2016/0235387 A1 | 8/2016 | Murray |
| 2016/0256129 A1 | 9/2016 | Ergler et al. |
| 2019/0110770 A1 | 4/2019 | Demharter |

WIRELESS CT DATA TRANSMISSION

FIELD OF THE INVENTION

The invention relates to imaging systems with wireless communication capability, to a method of wireless communication for an imaging system, to a computer program element and to a computer readable medium.

BACKGROUND OF THE INVENTION

In medical imaging, and in imaging in general, computed tomography ("CT") acquisitions can produce large amounts of data in a short period of time. This is compound even further with the emergence of spectral CT in the last years. Spectral CT produces even more data as in some spectral imaging technologies detectors are used with more than one sensor per image pixel.

Current solutions for moving data between a CT scanner's moving gantry and the CT scanner's stationary part are based on optical communication over a slip ring. The slip ring may also be used to supply the moving gantry with power.

The necessary data rates for non-spectral CT are currently in the order of 10 Gbit/s and for spectral CT accordingly higher, at about more than 100 Gbit/s.

The current optical solutions are expensive custom hardware.

SUMMARY OF THE INVENTION

There may therefore be a need for alternative solutions for data communication in relation to rotatory imaging systems.

The object of the present invention is solved by the subject matter of the independent claims where further embodiments are incorporated in the dependent claims. It should be noted that the following described aspect of the invention equally applies to the method of wireless communication for an imaging system, to the computer program element and to the computer readable medium.

According to a first aspect of the invention there is provided an imaging system with wireless communication capability, comprising:
  a gantry rotatable around a rotation axis, the gantry including a detector device capable of recording, in plural spatial positions, measurement data in relation to a subject (such as a patient) to be imaged;
  at least one radio transmitter for generating a directed radio beam propagatable along a propagation axis to transmit the measurement data to a radio receiver;
  wherein the radio transmitter s arranged at the rotatable gantry and is operable so that the propagation direction intersects the rotation axis in a region/location that is situated away from the rotatable gantry,
the system further comprising a receiver, wherein the said receiver is located at said location/region.

In particular, the said region/location being away from the gantry, includes that no plane perpendicular to the rotation axis and intersecting either the rotatable gantry or a stationary gantry of the imaging system, can intersect the said region/location.

In embodiments, the system further comprises an examination table on which the subject (such as a patient) to be imaged is depositable during imaging, and wherein said location is situated away/beyond said table.

In embodiments, the transmitter includes an array of antenna elements operating in concert to form the directed beam.

In embodiments, there is a plurality of such transmitters arranged around said rotation axis and on the said rotatable gantry, with the respective propagation axes intersecting at said region/point. The propagation axes trace out a cone whilst the rotatable gantry rotates.

In another aspect there is provided an imaging system with wireless communication capability, comprising:
  in a fixed gantry, a rotatable gantry rotatable around a rotation axis, the gantry including a detector device capable of recording, in plural spatial positions, measurement data in relation to a subject (such as a patient) to be imaged;
  at least one radio transmitter for generating a directed radio beam at a transmit energy to transmit the measurement data to a radio receiver;
  a switching logic operable to switch the transmitter between two modes, a leisure mode and a duty mode, wherein the transmit energy in duty mode is higher than it is in leisure mode;
  wherein the at least one radio transmitter is arranged at the gantry so as to be rotatable with the gantry;
  wherein the radio receiver is arrangeable away from the gantries at a first fixed region;
  wherein there is a communication corridor definable that extends from the said first region to a fixed second region in space;
  wherein the at least one radio transmitter is passable through said second region during rotation of the rotatable gantry, and
  wherein the control logic is operable to switch the at least one radio transmitter from leisure mode into duty mode only when the said radio transmitter enters the said second region, with the transmitter remaining in duty mode whilst the transmitter passes through the said fixed second region.

In embodiments, there is a plurality of such radio transmitters arranged at the gantry.

In embodiments, the at least one transmitter operable at a frequency of at least about 1 GHz or more.

The proposed communication system as used in and with the imaging system is suitable for fast and stable communication and able to cope with the fast gantry rotation speed of about four rotations per second and hence with the resulting rapid changes of the transmission channels (that is, the direct path from transmitter antenna to receiver antenna) and with reflections off the exam room in which the imager is set-up. Despite this fast moving environment, the proposed communication system enables using high-throughput transmitter/receiver equipment with (preferably "massive") multi-input/multi-output ("MIMO") and antenna-array-based beam shaping, such as equipment envisaged in 5G wireless technologies or any other wireless scheme.

Because of the in-room arrangement of the receiver away from the imager, a higher degree of set-up flexibility is afforded and corridors without obstacles such as an exam table or other equipment can be easily implemented. In-room arrangement of the receiver (as opposed to on-imager arrangement) as mainly envisaged herein also allows easier maintenance (because of better access), and facilitates retro-fitting existing imagers with wireless communication capability. The proposed setup, with the intersection away from the gantry allows transmitting/receiving data without intermediaries, thus cutting component count and/or costs.

Furthermore, without the proposed system, transmit power and data redundancy in form of additional error correction codes may have to be increased to reduce error rates. But this may run counter the desire to reach the required high data rates in hospital environment, where mobile radio cell needs to be as small as possible by limiting the allowed transmit power. Thanks to the proposed system, the required data rates are achievable in these circumstances.

In embodiments, it is proposed to include multiple transmitters/antennas at the back of the CT scanner that can be switched during the scan in order to compensate for the rotation. The communication corridor, the path between transmit and receive antenna (arrays) is approximately kept invariant with respect to the rotation. There are no rapid changes to the transmission channel any more, and the antenna beam shaping can focus directly towards the receiver. Both effects are beneficial for the overall achievable transmission rate. The control logic switches the transmitters between duty mode or leisure mode to so choose transmission channels. In some embodiments, the control logic is configured to evaluate background signals received by the receivers. Based on this evaluation, adequate measures are taken to ensure sufficient transfer rates.

The proposed communication system can be built from wireless communication equipment envisaged for mobile phone or IoT communication. The latest generation of wireless communication chips, such as 5G equipment, provide suitable data rates, but other equipment may be used instead. Because of the expected large scale manufacture, use of such equipment in imaging equipment may be commercially more viable than current optical custom solution.

In embodiments, the imaging systems are X-ray imaging systems.

In embodiments, the imaging systems are configured for multi-energy X-ray imaging systems.

In another aspect there is provided a method of wireless communication for an imaging system, the system comprising at least one radio transmitter for generating a directed radio beam propagatable along a propagation direction to transmit measurement data recorded by a detector of the imaging system to a radio receiver, wherein the at least one radio transmitter is arranged at a rotatable gantry of the imaging system so as to be rotatable with the rotatable gantry relative to a fixed gantry, there being defined a communication corridor that extends from i) a first fixed region located away from the gantries, where the radio receiver is located, to ii) a second fixed region in space, the method comprising the step of:

switching the at least one radio transmitter from a leisure mode into a duty mode, only when the said radio transmitter enters the said second fixed region, and maintaining the duty mode whilst the radio transmitter passes through the said fixed second region, wherein the transmit energy in duty mode is higher than it is in leisure mode.

As an alternative to the above mentioned embodiments and aspects, "reversed" configurations are also envisaged, where it is the one or transmitters that are arranged in-room away from the gantries, whilst it is the one or more receivers that are arranged in or at the rotatable gantry to rotate therewith.

In particular, according to an alternative aspect there is provided an imaging system with wireless communication capability, comprising:
a gantry rotatable around a rotation axis, the gantry including a device capable of processing data;
at least one radio receiver for receiving, in a directed radio beam propagatable along a propagation axis, data from a radio transmitter;
wherein the radio receiver is arranged at the rotatable gantry and is operable so that the propagation axis intersects the rotation axis in a location that is situated away from the rotatable gantry.

Again, there may be a plurality of such receivers arranged around said rotation axis and on the said rotatable gantry, each to receive data in beams propagatable along respective propagation axes intersecting at said region.

In another aspect there is provided an imaging system with wireless communication capability, comprising:
in a fixed gantry, a rotatable gantry rotatable around a rotation axis, the gantry including a device capable of processing data;
at least one radio receiver for receiving, in a directed radio beam at a transmit energy, the data from a radio transmitter;
a switching logic (SL) operable to switch the transmitter between two modes, a leisure mode and a duty mode, wherein the transmit energy in duty mode is higher than it is in leisure mode;
wherein the at least one radio receiver is arranged at the gantry so as to be rotatable with the gantry;
wherein the radio transmitter is arrangeable away from the gantries at a first fixed region;
wherein there is a communication corridor definable that extends from the fixed first region to a second region fixed in space;
wherein the at least one radio receiver is passable through said second region during rotation of the gantry, and wherein the control logic is operable to switch the at least one radio transmitter from leisure mode into duty mode only when the said radio receiver enters the said second region, with the transmitter remaining in duty mode whilst the radio receiver passes through the said second region.

In yet another aspect there is provided a method of wireless communication for an imaging system, the system comprising a radio transmitter for generating a directed radio beam propagatable along a propagation direction to transmit data to a radio receiver, wherein the radio receiver is arranged at a rotatable gantry of the imaging system so as to be rotatable with the rotatable gantry relative to a fixed gantry, there being defined a communication corridor that extends from i) a first fixed region, located away from the gantries where the transmitter is located, to ii) a second fixed region in space, the method comprising the step of:

switching the at least one radio transmitter from a leisure mode into a duty mode, only when the said radio receiver enters the said fixed second fixed region, and maintaining the duty mode whilst the radio receiver passes through the said second fixed region, wherein the transmit energy in duty mode is higher than it is in leisure mode.

The leisure mode may include complete switch-off of any (or no measurable) energy being transmitted, although such a hard switching is not always required. Complete switch-off may save energy consumption. A mere reduction to lower (non-zero) energy levels may make the switch circuit quicker and may increase its lifetime.

In these "reverse" embodiments, the data processing/generating device may still be the X-ray detector, but may in addition or instead include other devices such as a control device, or any other data processing device at or in the rotatable gantry that need to be supplied with data from the remote transmitter(s). For example, the transmitter may transmit control data/signals to control circuity in the rotatable gantry to control its rotation, or may transmit control signals to control circuitry of the detector to set/re-set certain detector settings, etc.

In another aspect there is provided a computer program element, which, when being executed by at least one processing unit, is adapted to cause the processing unit to perform any one of the above mentioned methods.

In another aspect there is provide a computer readable medium having stored thereon the program element.

The imaged subject can be is animate and includes a human or animal patient or a part thereof, or the subject is inanimate such as an item or luggage in a security screening system or a sample object in non-destructive material testing.

A User may refer to a person (eg, a healthcare professional) who operates the imaging apparatus and/or system to image the object.

A "region" as used herein includes a point location.

The transmitter/receiver/transceiver being "arranged away from the gantry" of the imaging system may be defined in embodiments envisaged herein as follows: any imaginary plane that i) passes through the point/location/region of the transmitter/receiver/transceiver and ii) is perpendicular to the rotation axis of the imaging system, does not intersect the stationary and/or rotatable gantry.

BRIEF DESCRIPTION OF THE DRAWINGS

Exemplary embodiments of the invention will now be described with reference to the following drawings, which are not to scale, wherein.

DETAILED DESCRIPTION OF EMBODIMENTS

Figure 1:
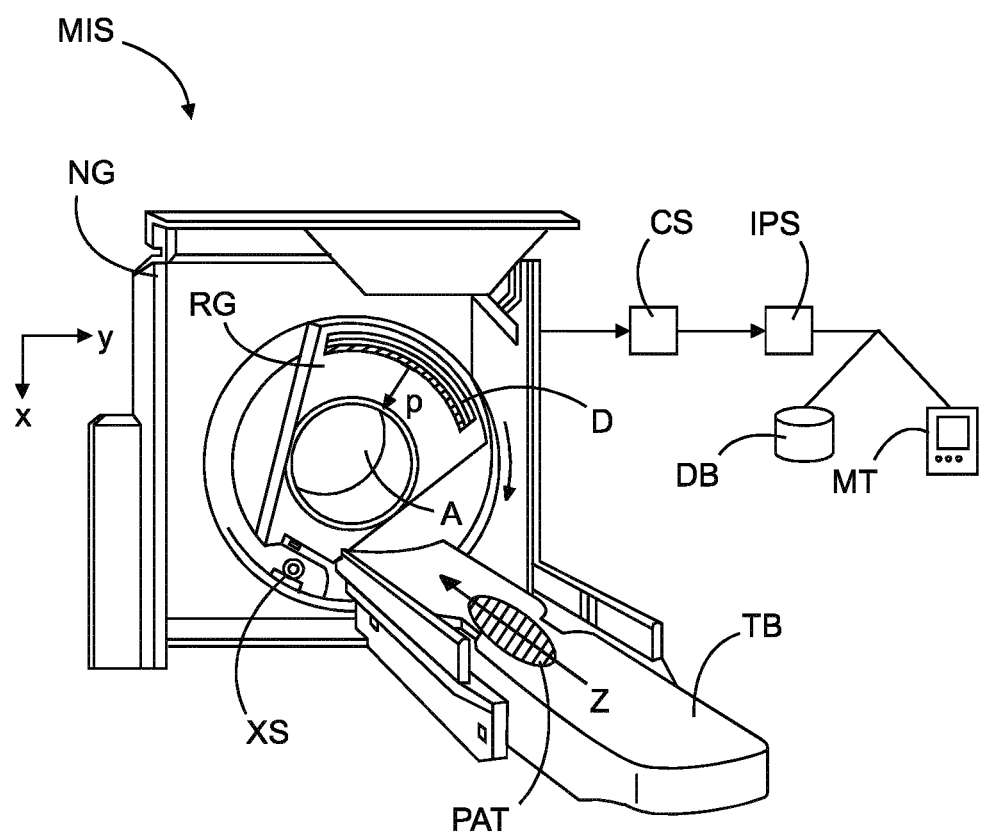
FIG. 1 shows a perspective view of a rotational imaging system.

With reference to FIG. 1 there is shown a schematic perspective front view of an image system MIS. A well-common use of such an image system is a medical image system or a baggage screening security system. The image system is preferably an X-ray imaging system of the rotatory type such as a CT scanner. Other rotational imaging modalities, such as C- or U-arm X-ray imaging apparatuses are also envisaged herein. In general, any rotational system with imaging units is envisaged herein, such as linear accelerators (linac) with imaging option, or others.

The image system MIS comprises a stationary gantry NG set-up in an examination room. The stationary gantry NG carries a rotational gantry RG rotatable around an examination region A with rotation axis Z passing therethrough. The rotational gantry is donut-shaped and the examination region A is formed as an opening therein. An examination table TB can be made to at last partly extend into the examination region along the rotation axis Z which may also be referred to herein as the imaging axis Z. A patient PAT, or an object to be imaged, resides on the examination table. The table TB with the patient PAT or object thereon may be advanced along imaging axis Z so that a region of interest comes to lie in the examination region A. The examination table TB is optional.

The rotational gantry includes a detector module D that is capable of detecting X-radiation. The rotational gantry RG may further include an X-ray source XS. The source XS is arranged on the rotational gantry RG in opposed spatial relationship to the detector D and across the examination region A. However, it is not necessarily the case that the X-ray source XS is mounted on or integrated in the rotational gantry RG in all embodiments. For example, in embodiments, the source XR may be arranged outside the rotating gantry, on the stationary NG, as an annulus around the examination region. Such as stationary X-ray source unit may comprise a number of individual sub X-ray sources for example, or one single integral source forming the annulus.

During imaging, X-radiation emanates from the X-ray source XS and interacts with patient tissue, then emerges from the patient's far end to then impinge on the detector D. The impinged radiation is converted by the detector D into (projection) measurement data (sometimes referred to as detector raw data). The measurement data collected at the detector D include intensity values. During imaging, the rotational gantry rotates and with it the detector and in certain embodiments also the X-ray source.

Due to the rotation, the rotating detector receives X-radiation from plural spatial directions and measurement data can be acquired from a multitude of different spatial directions p relative to the patient. In some imaging protocols, the table TB advances along the imaging axis Z to collect measurement data at different locations. An image plane (or "image domain") in which image data is re-constructible from the measurement data is schematically indicated by directions X,Y, each image plane being perpendicular to the imaging axis Z. There are different such parallel image planes, one for each location on the Z axis. An external or on-board power supply (not shown) supplies power to rotational gantry RG (and/or components thereon) via a slip-ring arrangement. An operator console (not shown) may allow a user (such as a medical personnel) to control the imaging operation. The user may use the operator console to issue imaging control signals such as X-ray source settings, detector settings, or signals that control speed of the rotation, movement of the table TB, etc.

The rotational imaging system is configured for wireless communication. To this end, it includes in part a wireless communication system CS. Broadly, in embodiments it is in particular the measurement data collected at the detector D that can be communicated through the wireless communication system CS to an intended, remote, one or more recipients, such as an image processing system IPS.

The image processing system IPS may be arranged as computer system that runs imaging software such as an image reconstruction algorithm that allows converting the (projection) measurement data from the projection domain into cross sectional imagery in the image domain X,Y. A multitude of cross sectional imagery may be acquired along the imaging axis Z which can be assembled into a 3D image volume. Other tasks may be performed by the image processing system IPS. The image processing system IPS may reside on a single or a plurality of computers such as in a "Cloud" setting or other distributed architectures. Instead of, or in addition of providing the measurement data to the image processing system, the measurement data may be forwarded for storage to a database DB (such as a PACS of a HIS) or other memory. The reconstructed imagery or the measurement data may be visualized on a display device MT or may be otherwise processed.

In embodiments data other than (projection) measurement data may need to transmitted in addition or instead via the communication system CS. For example, the image processing system may be integrated into the moving gantry RG and it is the reconstructed imagery output by the image processing system that may need to be transmitted via the communication system CS to a remote recipient.

In general, data flow of main interest herein is from the rotatable gantry RG to a recipient outside the rotatable gantry RG, possible remote from the imaging system MIS. In other embodiments, the opposite data (back-)flow from outside the gantry, or even remote from the imaging system, back to the rotatable gantry RG (or to a component therein or thereon) is also envisaged instead or in addition. An example of such "back flowing" data are the imaging control signals from the operator console, or any data that is receivable in a component integrated into the rotatable gantry RG.

Reference is now made to the schematic block diagrams in FIG. 2 to explain the wireless communication system CS in more detail. "Wireless communication" as understood herein includes communicating information (such as the measurement data or other data) over the air by using electromagnetic radiation in a suitable frequency section of the spectrum. Electromagnetic waves in the given spectrum are modified by modulation so as to be able to carry the information over the air.

Broadly, the communication system CS includes one or more transmitters TX and one or more receivers RX. The operation of the communication system will be explained with main reference to the transmitted data being the measurement data collected by the detector, but this is not to limit the principles disclosed herein as any other data may transmitted in either direction.

The transmitter TX (we will refer herein frequently to 'the transmitter' with the understanding that there can be a single one or more than one) is configured to transmit the measurement data received from the detector on the rotatable gantry over the air to the receiver RX (again we will frequently refer herein to 'the receiver RX', with the understanding that there can be more than one).

As will be explored more fully below, the transmitter TX is arranged at or in the rotational gantry, whilst the receiver RX is arranged in the examination room, but spatially distanced and away from the rotational gantry RG and/or stationary gantry NG. For instance, the receiver RX may be mounted on the ceiling, on the wall or on the ground, or may be suspended or otherwise arranged in the room. The receiver RX may be arranged on the wall behind the non-rotational/rotational gantry. Preferably but not necessarily, the receiver is arranged in the same room where the imaging system MIS is set up.

Figure 2A:
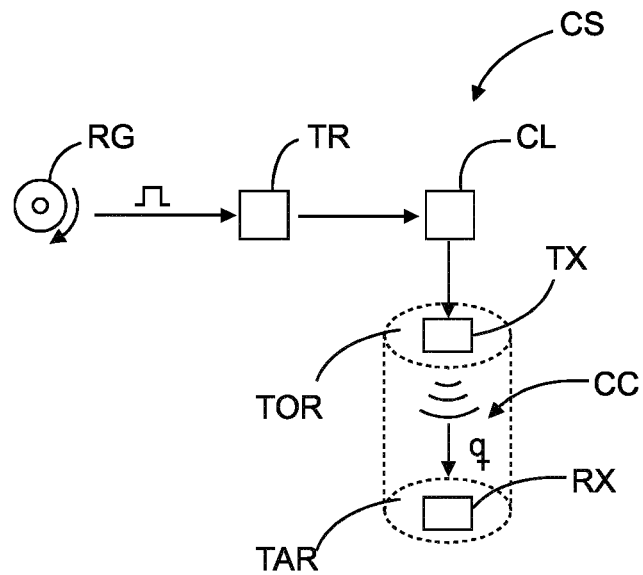
FIG. 2A shows a block diagram of a wireless communication system.
Figure 2B:
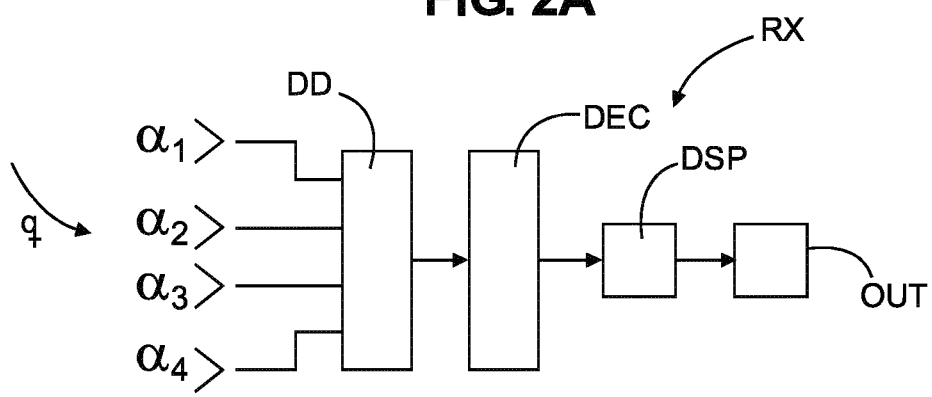
FIG. 2B shows a schematic block diagram of a receiver component.
Figure 2C:
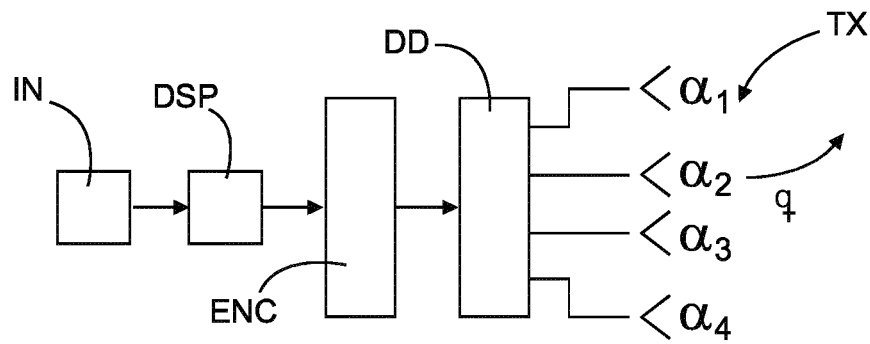
FIG. 2C shows a schematic block diagram of transmitter component.

FIGS. 2B and 2C show each schematic block diagrams of the receiver RX and the transmitter TX, respectively.

Turning now first to the transmitter TX at FIG. 2C, this includes an input port IN where data (such as the measurement data) to be transmitted is received. The transmitter TX component may include a digital signal processor DSP to process or otherwise condition the to-be-transmitted data ("payload"). An encoder component ENC encodes the data suitably. Preferably as envisaged herein, the transmitter TX has beam forming capability. The transmitter can direct a radio beam at a desired spatial direction q. The radio beam has the payload modulated therein by a modulator that includes a directional antenna driver component DD. The directional driver component DD receives the encoded data from the encoder and drives a set of one or more antenna elements, exemplary shown as $\alpha_1$-$\alpha 4$, to produce the directional beam along the pre-selected direction q and which carries the information over the air. Each antenna element causes its own radio wavelet, but their phases are so tuned by the driver DD that the wavelets interfere constructively at places and destructively at others so as to given rise to the directed radio beam (eg, main lobe). The transmitter TX is further coupled to a power source (not shown), external or on-board to provide energy. This energy is used to transmit the beam at a certain transmit energy. The energy is adjustable and so is the direction of beam q. Adjustment is by a user or through interfacing with other devices, such as with a control logic CL as will be explained in more detail below.

The receiver RX component at FIG. 2B has a similar structure as the transmitter TX and includes a set of receiver antenna elements $\alpha'_1$-$\alpha'_4$ at which the incoming data beam (previously transmitted by the transmitter TX) is registered. A directional driver or tuner DD' of the receiver RX may be used to tune the receiver antenna elements $\alpha'_1$-$\alpha'_4$ to be signal-receptive to a specific spatial direction q that corresponds to the direction q at which the data has been sent by the transmitter TX. A decoder components DEC decodes the received data to so recover the previously transmitted data. The recovered data may then be processed by an optional signal processor DSP, such as for error correction or other. The payload is then output through output interface OUT and may then be forwarded through another wireless connection or a wired connection to its destination such as the image processor IPS, a data storage, or any other suitable signal receiving recipient. One or each of the transmitter TX and receiver RX may include on-board storage elements (not shown) to buffer at least parts of the to-be-sent or received data.

As shown in the FIGS. 2B and 2C, the transmitter TX and/or receiver modules RX may have a MIMO, in particular "massive" MIMO, architecture to enable or at least facilitate parallel data processing at reception and/or transmission.

Whilst the transmitter TX and receiver modules RX have been described above in MIMO setup with beamforming using an array of antenna elements (phased antenna array), this is not necessarily so in all embodiments. More traditional modules TX, RX may be used instead, with single or few (eg, less than 5 or 10) antenna elements. In particular, the receiver RX may not necessarily have a phased array of antenna elements. A single or few antenna elements may suffice. Also the antenna element(s) may be receptive to signals from different directions. TX, RX modules with (massive) MIMO and phase array antennas as mainly envisaged herein, have antenna elements in the double digits, such as more than 10, more than 20, more than 50, or even in the three digit numbers. Operating frequencies are the GHz range, with millimeter waves envisaged. Mobile phone, WIFI, or other wireless technologies may be used, either as is, or suitably adapted if required.

Receiver capability and transmitter capability can be combined into a single unit to form a transceiver TX/RX. It is understood that either one or both of transmitter TX and receiver RX may be are arranged as a transceiver TX/RX. Although transceivers are preferable, this is not necessarily required in all embodiments discussed herein. In other words, in embodiments, the transmitter TX is configured only for transmitting and/or the receiver RX is configured only for receiving signals. In the following a reference to either transmitter TX or receiver RX is understood to include a reference to "transceiver" so all that is described below is applicable to transceivers also.

Referring back to the block diagram at FIG. 2A, operation of the communication system CS will now be explained in more detail. The proposed wireless communication system CS is configured to tackle the challenge of reliably transmitting at high data-throughput in particular the measurement data from the rotating transmitter TX to the receiver RX. The receiver RX is envisaged to remain stationary at a single location, at least during transmission. Due to the very high rotational speeds attainable by the rotational gantry, and hence by the detector, of about four revolutions per second, no sufficient data throughput at the desired quality can be achieved if the rotation is not compensated for.

The proposed communication system CS is equipped with such a motion compensation scheme. More particularly, the wireless communication system CS is configured to form a fully or partly spatially invariant and stationary communication corridor CC shown in the FIG. 2A diagrammatically as a cylinder in dashed lines. The corridor CC defines that portion in space through which data is transmittable along direction q.

One end of the corridor CC (the "take-off region" TOR) is to include the transmitter TX whilst the other end (the "target region" TAR) is to include the receiver RX. Despite the rotation of the transmitter, the communication corridor CC itself remains in embodiments wholly spatially invariant and fixed at a given pose in space. This spatial invariance of the corridor CC against the TX-rotation is achieved by having the communication system CS include a tracker TR component in communication with a switch logic CL. Size, cross-section or shape of the target region TAR may depend on the number of receivers to be arranged, and/or on the width/cross-section or direction characteristics of the radio beam coming from the transmitter(s) TX.

The switch logic CL switches on and off the transmitter TX in synchrony with rotational position of the rotational gantry RG as tracked by tracker TR. Only when the transmitter (or any one of the transmitters, if there is a plurality of such transmitters) passes through the take-off region, the transmitter is energized to transmit data. But once the transmitter TX leaves the take-off region due to the rotation, it is switched back off. Once the next transmitter enters or the same transmitter re-enters the take-off region, the respective TX is switched on (again), and so and so forth in synchrony. The tracker TK is in communication (preferably though a wired connection) with an encoding system of a motor device that drives the rotational gantry. The encoder system provides a numeric definition of the angular position of the rotational gantry relative to a reference position, such as the twelve o'clock position upright for instance. Based on the tracker information from the tracker TR, the control logic CL then switches on or off the one or more transceivers in synchrony. In detail, the respective transmitter TX is switched on when the known TX position on the rotational gantry passes through a pre-defined angular range. The take-off region includes this pre-defined angular range. The range may be defined very narrow so that only a single transmitter TX can ever reside therein at any time. Alternatively, and preferably, a broader angular range segment is used as take-off region so that multiple transmitters TX can reside at the same time therein and some or all are switched on and allowed to transmit, thus increasing data throughput. Preferably the corridor CC is so defined in space that it does not intersect obstructions such as, patient, exam table TB or other equipment or parts of the imager MIS. The tracker TR and switch control logic CL may be integrated into a single control module. The tracker TR and/or the control logic CL may be mounted on or integrated into the rotating gantry RG.

Instead of a hard switching scheme in which the energy supply to the transmitter TX is switched on and off, a "soft" switching scheme may also be envisaged instead. In soft switching, the transmitter TX is switched from a low energy transmission mode to a high energy transmission mode in which radiation is transmitted at higher energy than in the low energy transmission mode. In other words, the control logic CL switches in synchrony with the angular position of the rotational gantry, each one of the transmitters TX between a duty mode and a leisure mode or state. A "leisure mode or state" includes herein a complete switch off or a switch down to lower energy transmission whilst "duty mode or state" includes switching on or at least switching up to transmit at a higher transmission energy than the transmission energy in leisure mode.

The spatially invariant corridor CC is defined by the switching operation of the logic CL that synchronizes angular positions of the transmitters on the rotating gantry RG with the switching between duty and leisure mode. The spatially invariant corridor CC is a portion of space that envelopes communication paths may be thought of as a cylinder or any other geometric shape that extends from the take-off region, through which the transmitters TX are passed, to the target region at which the preferably stationary receiver RX resides. The switching logic CL in effect allows angular-position-synchronized channel hopping and in doing so maintains the spatial invariance of the communication corridor CC.

In embodiments, the switching logic CL is not merely configured to switch TX between duty and leisure mode, but may further be configured to choose appropriate frequency transmission channels. Moreover, in embodiments, the control logic CL is configured to evaluate background signals, like noise or signal reflections received by the receiver RX, for taking adequate measures that ensure sufficient transfer rates. These measures may include channel equalization or other filter-schemes to remove duplicate out-of-phase signal contributions. In order to obtain stable and high-throughput transmission results it can be useful to switch channels during communication not only based on gantry position, but in addition on background signals like noise or reflections. A signal processor, such as DSP, may be arrange in the receiver RX to estimate the noise level to predict signal contributions that stem from reflection. It can also be useful to communicate on multiple channels simultaneously for obtaining maximum throughput. This multiple channel transmission protocol may be implemented by choosing the take-off area broad enough to accommodate more than any transmitter TX at any one time as mentioned above.

It should be understood that whilst in the above the payload (such as the measurement data) is transferred from the on-movable-gantry-transmitter(s) TX to the stationary in-room receiver RX, reverse data flows may also be envisaged. If transceivers are used, data can be transferred from the stationary in-room transceiver TX/RX to the on-movable-gantry-transmitter TX, such as imaging control signals or other data.

Figure 4A:
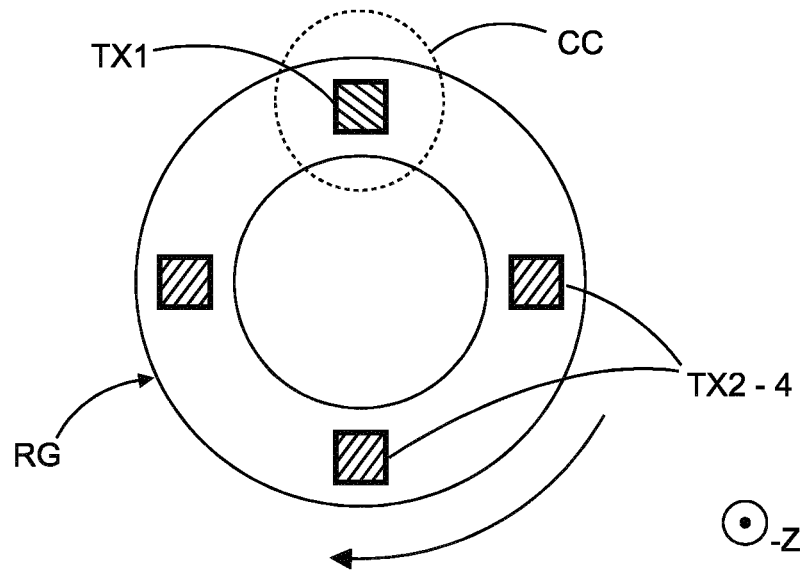
FIGS. 4A and 4B shows an imaging system including a wireless communication system according to a second embodiment.
Figure 4B:
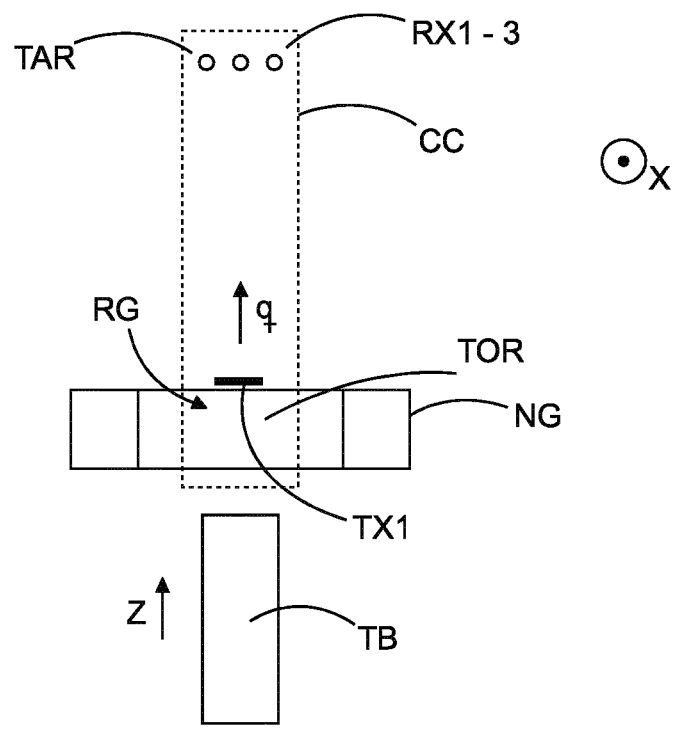
Figure 5:
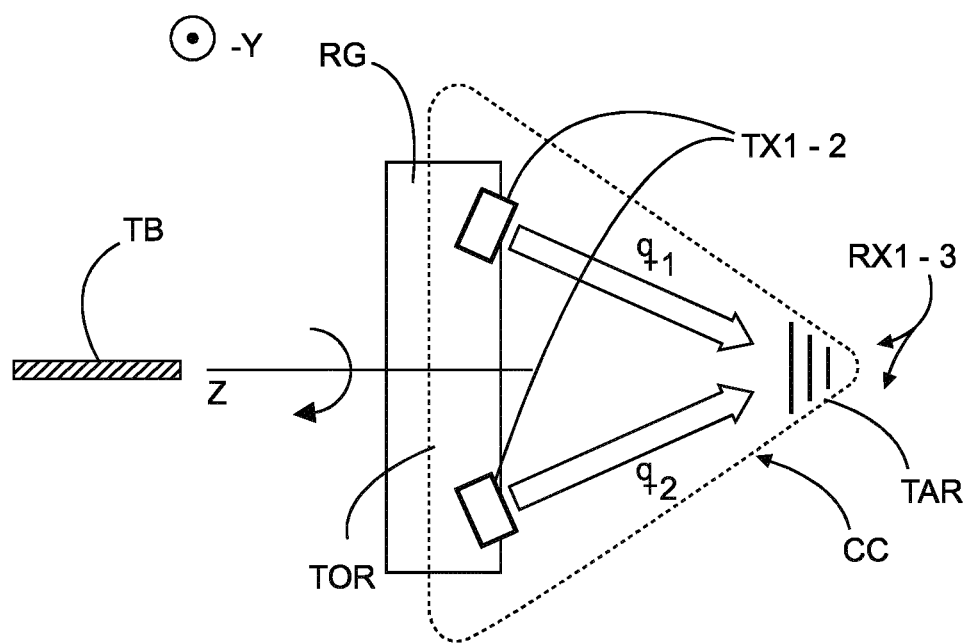
FIG. 5 shows an imaging system including a wireless communication system according to a third embodiment.

Reference is now made to FIGS. 3-5 which illustrate different communication corridor CC arrangements as envisaged herein in embodiments. The corridors are defined in FIGS. 3 and 4 by the above described inter-operation between tracker TR and switching logic CL, and by a specific geometric arrangement in FIG. 5.

Figure 3A:
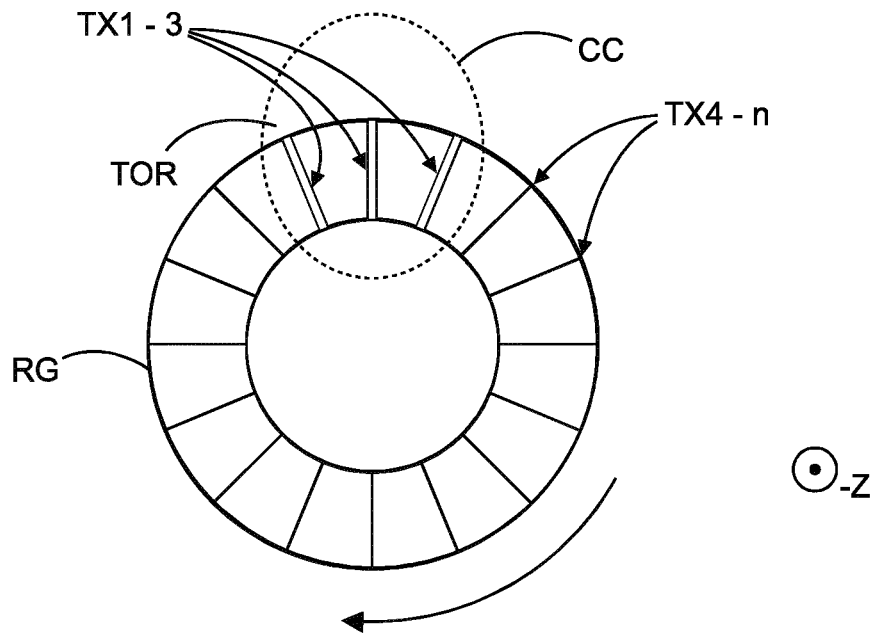
FIGS. 3A and 3B show an imaging system including a wireless communication system according to a first embodiment.

Referring first to FIG. 3, this shows in FIG. 3A a frontal view in the (X,Y)-plane from the back of the imaging system viewed along direction −Z. The transmitters TX1-$n$ are arranged in a regular, equidistant angular pattern at the back of the rotational gantry RG. In this embodiment, 16 transmitters are spread out evenly over 360° at segments 22.5° wide. The take-off region of the corridor is defined at the 12 o'clock position, about 45° wide to accommodate 3 transmitters TX in duty mode. The FIG. 3A pattern is an example and any other transmitter distribution in position and number, and any other angular position/width of the take-off region are also envisaged. The selection of a suitable take-off-region position and width may depend on local obstructions present in the exam room. The size of the take-off region can be pre-defined and programmed into the switching logic CL of the communication system CS. In FIG. 3, the take-off region accommodates logic at any time during the rotation only three TX1-3 transmitters of the total number of transmitters. Only three transmitters TX are switched into duty mode at and one time, when entering and residing in the take-off region of the communication corridor. All remaining transmitters TX4-$n$ outside the take-off region are switched into leisure mode by operation of the switching logic CL.

Although a plurality of transmitters TX are used in the design in FIG. 3, it is also envisaged that a single transmitter may be used in embodiments. The size of the take-off region may be defined for a single transmitter or for a plurality such as two, three or more. However, having a narrow take-off region will come at the expense of data throughput. It is desirable to have the take-off region accommodate a plurality of transmitters to be able to data-transmit via plural transmitters at the same time.

Figure 3B:
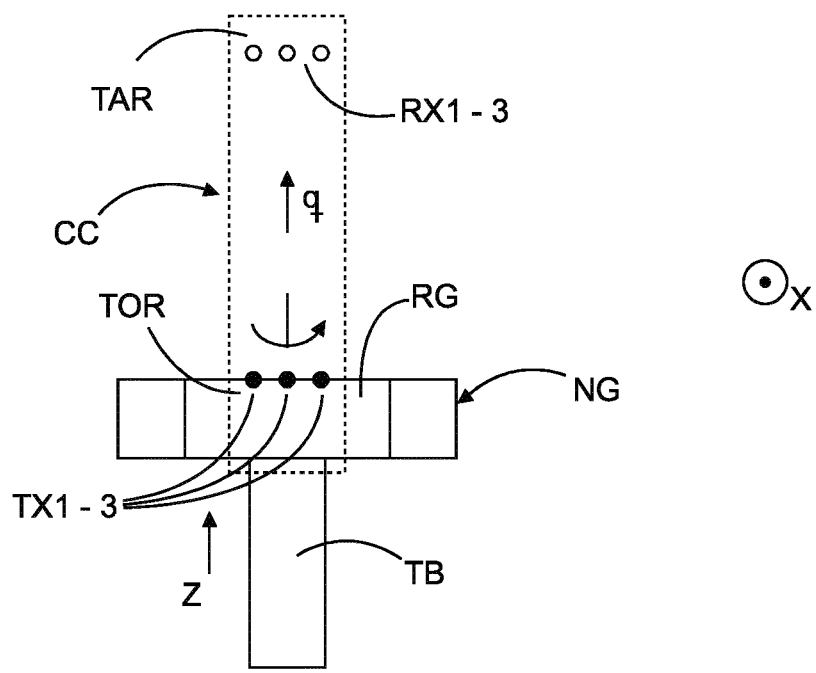

FIG. 3B shows the arrangement of FIG. 3A in plan view in the (Y,Z)-plane. This shows in more detail the communication corridor CC formed as a cylinder in this embodiment with the target region including at least one, or in this exemplary embodiment, three receivers RX1-3. The receivers RX1-3 are arranged away from the gantries NG, RG. More particularly, the receivers RX are arranged such that an imaginary plane that passes through the receivers' RX location and is perpendicular to the imaging axis Z does not intersect the gantries NG or RG and the exam table TB. As shown in FIG. 3B, three transmitters TX1-3 are currently in duty mode as these pass through the take-off region in corridor CC.

The one or more receivers RX may be mounted on the wall preferably at about the same height as the take-off region. However, because of the beam forming ability the receiver could be anywhere in space. The receiver RX may be wall mounted, it may be ceiling mounted, or suspended from the ceiling or mounted on the ground. In embodiments, the receiver RX is not fixedly installed but is mounted on a movable dolly with wheels or any other portable device so that the receiver may be moved to any desirable position in the room which gives more flexibility. In this embodiment, the directional drivers DD of the transmitter TX and receiver RX must be reset and tuned to the new spatial position of the receiver RX1-3. However, it is preferred that the receiver RX is fixedly mounted in one single position in the room. If the transmitters TX include a directional antenna elements of longitudinal shape it may be desirable for the longitudinal axis of each of those antenna elements to be parallel to the imaging axis Z. This allows a more streamlined and compact design.

Referring now to FIG. 4, these show again a back view of the scanner MIS along direction −Z in FIG. 4A and a plan view in FIG. 4B. The arrangement of FIG. 4 is similar to the arrangement previously discussed in FIG. 3. However, in FIG. 4, the transmitters TX and/or receivers RX include phased arrays shown in the drawings as small square areas. In this particular embodiment four transmitters TX with phased transmitter arrays are arranged in an equidistant angular pattern. At any one time, only a single one of the transmitters, for example TX1, is in duty mode as it resides in the take-off region of the corridor CC. In FIG. 4, the take-off region is again shown at 12 o'clock position. Again, as before, this is exemplary and other angular positions of the take-off region are also envisaged. Less than four phased array transmitters TX or more than four transmitter TX may be used in alternative embodiments.

Reference is now made to FIG. 5 which shows an embodiment where an at least partly spatially invariant communication corridor CC is realized by geometrical arrangement rather than through the synchronized switching in FIGS. 3 and 4. That is, the embodiment in FIG. 5 may be realized without a switching logic CL and tracker TR, the receiver RX being receptive to signals incoming from along each of the different propagation axes $q_1$, $q_2$.

The invariant communication corridor CC is formed or defined by arranging the receiver(s) RX1-3 at a spatial location away from the gantry RG/NG and on the rotational axis Z. FIG. 5 is a view of this configuration along direction −Y in side elevation. Again, as in FIGS. 3 and 4, the receiver(s) RX are spatially away from the gantries NG, RG so that a plane (not shown) passing through the receiver RX location and perpendicular to the rotational axis Z does not intersect the gantry RG/NG and/or the table TB.

The transmitter(s) TX may be physically mounted so as to be tilted towards the location of the receiver RX1-3 on the rotation axis Z so as to be focused thereon. Each receiver propagates its data packets along different directions $q_1$, $q_2$. The propagation directions $q_1$, $q_2$ intersect the location at an intersection point (or region) at which the receiver RX1-3 is arranged on the rotational axis Z. However, such physical tilting may not be required if the transmitters have beam-forming capabilities. In such embodiments, the transmitter TX can be mounted flat on the gantry RG, but its directional driver DD is configured to cause radio beams being directed along the required propagation directions $q_1$, $q_2$ so as to intersect on the rotational axis Z at the target region where the receiver RX is mounted.

Preferably the intersection point $q_1 \cap q_2 \cap Z$ is situated where the imaging/rotational axis Z passes through the wall of the examination room in which the imaging system MIS is set up. The receiver may then be conveniently wall mounted at the said location. Arranging the receiver RX on a location on the rotation axis may also be done in either one of the embodiments in FIGS. 3 and 4.

This "geometrical" embodiment of FIG. 5 differs from switched-embodiments FIGS. 3 and 4 in that the invariance requirements on communication corridor CC is relaxed and forms a cone in space. Specifically, in this spatially semi-invariant embodiment, whilst the take-off regions do rotate, it is nevertheless the target region of the communication corridor that remains stationary. All transmitters TX can transmit information continuously throughout the rotation whilst the target region of the receiver RX remains stationary at space on the rotational axis fixed.

The transmitter(s) TX can again be arranged in an equidistant angular pattern around the rotational gantry as shown. A single transmitter TX, two transmitters (arranged opposite each other as shown in FIG. 5), or more such as three or four, of yet more may be arranged in at regular (angularly equidistant) or irregular pattern. Preferably, as in FIGS. 3 and 4, the transmitter(s) TX is mounted on the back of the rotating gantry, with the radio beams emanating therefrom and propagating into the half space into which imaging axis Z points to so avoid any obstruction that may be posed by the table TB. But just like in FIGS. 3 and 4, embodiments with transmitters TX mounted on the front of the rotatable gantry RG are not excluded herein.

In alternative embodiments of FIG. 5, a switching logic CL may still be used as explained above in connection with FIGS. 3 and 4 as an option in which case the communication corridor is no longer of convex shape, but is now non-convex. If switching logic is used, and if there are two or more transmitters, then the corridor splits up into edges of a triangle (for two transmitters TX) or into lateral edges of a pyramid (for three or more transmitters TX) with the intersection point $q_1 \cap q_2 \cap \ldots \cap q_i \cap Z$ forming the pyramid's apex for example.

As will be understood with reference to all of the above mentioned embodiments, having the receiver (s) RX arranged in space away from the gantry allows flexibility, easier access for maintenance and a commercial viable way of retro-fitting existing imagers with wireless communication capabilities.

In the above embodiments, and as described previously, it is envisaged to arrange the transmitters TX on the rotational gantry. The transmitters TX are preferably mounted on the rotatable gantry RG but away and outside the detector D. This is the preferred embodiment. Alternatively, in other embodiments it is envisaged that the transmitters are integrated into the detector housing. Integrating the transmitters TX into the detector module may allow saving on any additional connective circuitry. However, arranging the transmitters TX outside the detector module on the gantry RG allows better transmission throughput and signal quality, as potentially intervening structures such as a metallic detector housing may unfavorably interfere in the data path. Arranging the transmitter TX outside the detector D at the gantry RG preferably at the same angular position as the detector leads to an improved spatial relationship. Communication between the transmitters TX and the detector D may again be wireless but are preferably wired by having lines run from the transmitter TX input interface to detector ports that are coupled to the read-out lines of the detector module D.

The proposed communication system CS may be used with any wireless standard, general (eg for mobile phone communication) or bespoke. In particular, operating frequencies in the GHz range (such as 1 GHz or more, for example +5 GHz or more) are envisaged, achieving throughput rates of about 10, or even 100 Gigabits/s or more.

The proposed wireless communication system is particularly suitable for spectral or X-ray energy resolving imaging systems. This type of imaging systems may include specially designed detectors D that are able to resolve incoming radiation into energy ranges. Such detectors include double-decker detectors or those with photon-counting circuitry. These type of detectors or others with multi-energy detection capabilities produce large amount of data per image pixel which need to be transmitted as measurement data. In particular Spectral CT can benefit from the high throughput rates achievable with the proposed communication system.

It will be understood that for any one of the above described embodiments FIGS. 1-5, reverse configurations are also envisaged, where one or more receivers RX are mounted at or in the rotatable gantry, whilst the transmitter TX is mounted in-room away from the RG, NG gantries. The corridor CC will then run the other way with target region and take-off-region exchanged. This reverse configuration may be used when backflow of data is required. In this reverse configuration, it is then no longer detector measurement data that is transmitted, but other payload data, including for example, control signals for the detector D or for the rotatable gantry RG itself, or data for any other data-consuming component that is mounted in or at the rotatable gantry RG. In the embodiment with reverse configuration, with the transmitter(s) TX arranged at the fixed in-room take-of-location/region TOR at the intersection of the propagation axes extending to the receivers RX on the rotatable gantry, a switch logic CL may still be used to ensure data is sent to the fixed target region TAR, especially when a single transmitter is used. Alternatively and preferably, multiple transmitters TX1, TX2 are positioned at the intersection location TAR, each configured to propagate along respective, different one of the propagation axes $q_1, q_2$ so that data is transmitted in radio beams that form a cone CC. In this case, again, no switching logic CL is required.

Figure 6:
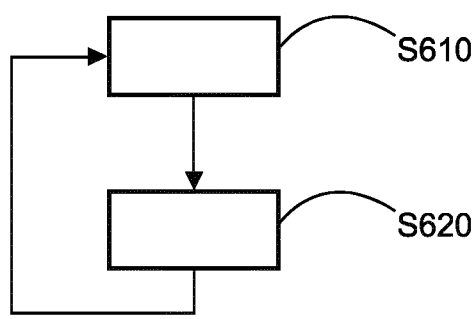
FIG. 6 shows a computer implemented wireless communication method for an imaging system.

Reference is now made to FIG. 6 which is a flow chart of a method of supporting wireless communication for imaging systems, in particular X-ray based with rotational X-ray detector and/or source.

At step S610 an angular position of a transmitter mounted on a rotational gantry of an X-ray imaging system is tracked. Once the transmitter enters a pre-defined take off region, a control or tracking signal is issued.

At step S620, based on the control or tracking signal, the transmitter is switched from leisure mode into duty mode to transmit payload to a stationary receiver arranged away from the gantry. The transmitter TX remains in duty mode upon entering and residing in the pre-defined angular region, the take-off region TAR, and is switched back into leisure mode upon egress from the pre-defined angular region. The switching cycle repeats upon reentry and so forth, for each transmitter. In this manner, an at least partly (in particular wholly) spatially invariant communication corridor can be achieved between the one or more transmitter and one or more receivers to receive the data sent from the transmitter.

In one embodiment at least one end of the corridor remains fixed in space whilst in other embodiments both end of the corridor, the take-off region and the target region, remain stationary and invariant in space during rotation of the one or more transmitters.

The method can be applied for a single transmitter or can be applied for a plurality of transmitters, switching every time from leisure into duty model each of the respective transmitters that enter, thanks to the rotation, the pre-defined angular region.

As mentioned above, duty mode and leisure mode can be defined as either a complete switch on or off or, in a soft switching scheme, where the energy is reduced with higher transmitter energy in the duty mode than in leisure mode.

The components of the communication system CS may be implemented as software modules or routines in a single software suit and run on a general purpose computing unit PU such as a workstation associated with the imager MIS or a server computer associated with a group of imagers. Alternatively, the components of the image processing system IPS may be arranged in a distributed architecture and connected in a suitable communication network.

In the reverse configuration, the tracking S610 is in respect of the receiver(s) and the switching at S620 is done in dependence on the receiver(s) entering and egressing the designated region, which, in this embodiment, is the target region TAR.

Some or all components of the system CS may be arranged in hardware such as in a suitably programmed FPGA (field-programmable-gate-array) or as hardwired IC chip. Some components of the system CS, in particular the switch logic CL, may be arranged in software, in hardware or in both. The switching logic CL and/or the tracker TR may be arranged as one or more microcontrollers.

One or more features disclosed herein may be configured or implemented as/with circuitry encoded within a computer-readable medium, and/or combinations thereof. Circuitry may include discrete and/or integrated circuitry, application specific integrated circuitry (ASIC), a system-on-a-chip (SOC), a machine, a computer system, a processor and memory, a computer program and combinations thereof.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium (in particular, but not necessarily, a non-transitory medium), such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An imaging system with wireless communication capability, comprising:
    a gantry rotatable around a rotation axis, the gantry including a detector for recording, in plural spatial positions, measurement data in relation to a patient to be imaged;
    at least one radio receiver;
    at least one radio transmitter for generating a directed radio beam propagatable along a propagation axis to transmit the measurement data to the at least one radio receiver;
    wherein the radio transmitter is arranged at the rotatable gantry and is operable so that the propagation axis intersects the rotation axis in a location that is situated away from the rotatable gantry, and wherein the receiver is located at said location.

2. The system of claim 1, further comprising an examination table on which a subject to be imaged is located during imaging, and wherein said location is situated away from said table.

3. The system of claim 1, wherein the transmitter includes an array of antenna elements operating in concert to form the directed beam.

4. The system of claim 1, comprising a plurality of transmitters arranged around said rotation axis and on the rotatable gantry, with the respective propagation axes intersecting at said location.

5. The system of claim 1, wherein the imaging system is an X-ray imaging system.

* * * * *